United States Patent [19]

Duran

[11] Patent Number: 4,822,227
[45] Date of Patent: Apr. 18, 1989

[54] FLUSH MOUNTED BOLT

[75] Inventor: John A. Duran, Glendora, Calif.

[73] Assignee: Avibank Mfg., Inc., Burbank, Calif.

[21] Appl. No.: 72,885

[22] Filed: Jul. 14, 1987

[51] Int. Cl.⁴ ............................................. F16B 23/00
[52] U.S. Cl. ..................................... 411/373; 411/403
[58] Field of Search ............... 411/402, 403, 353, 910, 411/429–431, 371–373, 377

[56] References Cited

U.S. PATENT DOCUMENTS

| | | | |
|---|---|---|---|
| 336,063 | 2/1886 | Palmer | 411/373 X |
| 915,068 | 3/1909 | Bowen | 411/373 |
| 2,133,409 | 10/1938 | Webb | 411/403 |
| 2,555,197 | 5/1951 | Lasky | 411/373 |
| 2,627,778 | 2/1953 | Hodell | 411/372 |
| 3,294,140 | 12/1966 | Cosenza | 411/999 X |
| 3,995,675 | 12/1976 | Cosenza | 411/353 |
| 4,285,380 | 8/1981 | Gulistan | 411/403 X |
| 4,452,556 | 6/1984 | Nelson et al. | 411/403 X |
| 4,655,658 | 4/1987 | Gulistan | 411/353 |
| 4,690,167 | 9/1987 | Skipper | 411/373 X |
| 4,701,089 | 10/1987 | Nettel | 411/373 |
| 4,723,881 | 2/1988 | Duran | 411/112 X |

FOREIGN PATENT DOCUMENTS

| | | | |
|---|---|---|---|
| 513968 | 6/1955 | Canada | 411/403 |
| 18503 | of 1913 | United Kingdom | 411/373 |
| 859182 | 1/1961 | United Kingdom | 411/429 |
| 1324973 | 7/1973 | United Kingdom | 411/373 |
| 1431769 | 4/1976 | United Kingdom | 411/403 |
| 15153 | of 1986 | United Kingdom | 411/373 |

*Primary Examiner*—Lloyd A. Gall
*Attorney, Agent, or Firm*—Poms, Smith, Lande & Rose

[57] ABSTRACT

A fastener assembly for joining a panel to a sub-panel comprising a receptacle assembly having a threaded stud secured to the undersurface of the sub-panel. The assembly includes a bolt having an enlarged head at one end and a nose at the other end. The panel has a countersunk opening aligned with an opening in the sub-panel. The bolt is threaded for threaded engagement to the stud. The head of the bolt has a countersunk opening configured to a tool for rotating the same. This opening includes a releasable plug which is moved downwardly upon insertion of the tool to permit rotation thereof, then returns to a position flush with the exterior of the head of the bolt surrounding the opening.

7 Claims, 5 Drawing Sheets

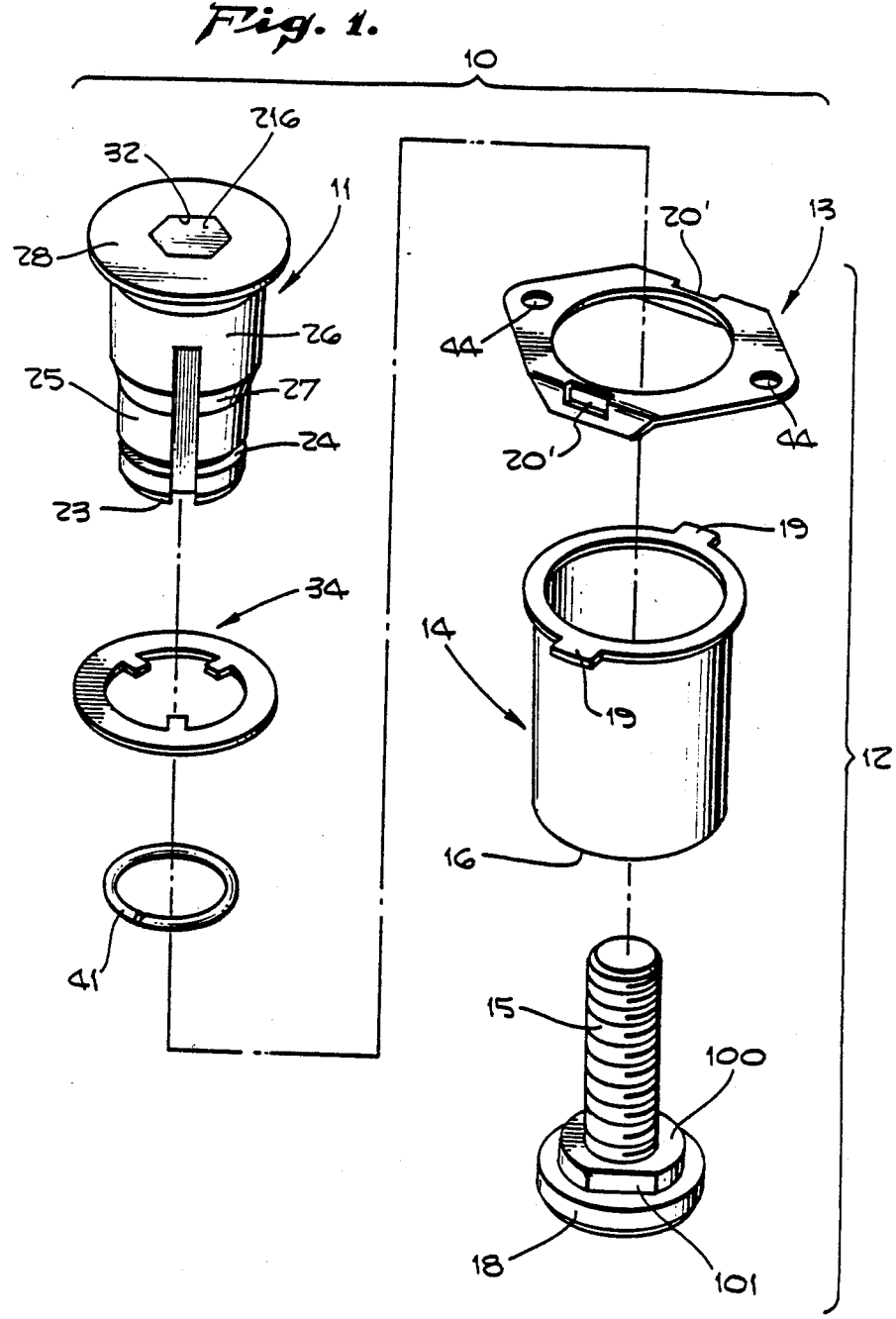

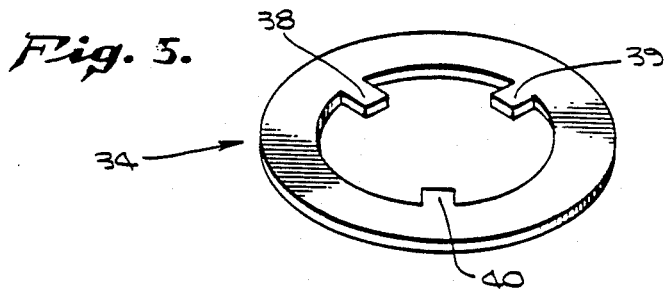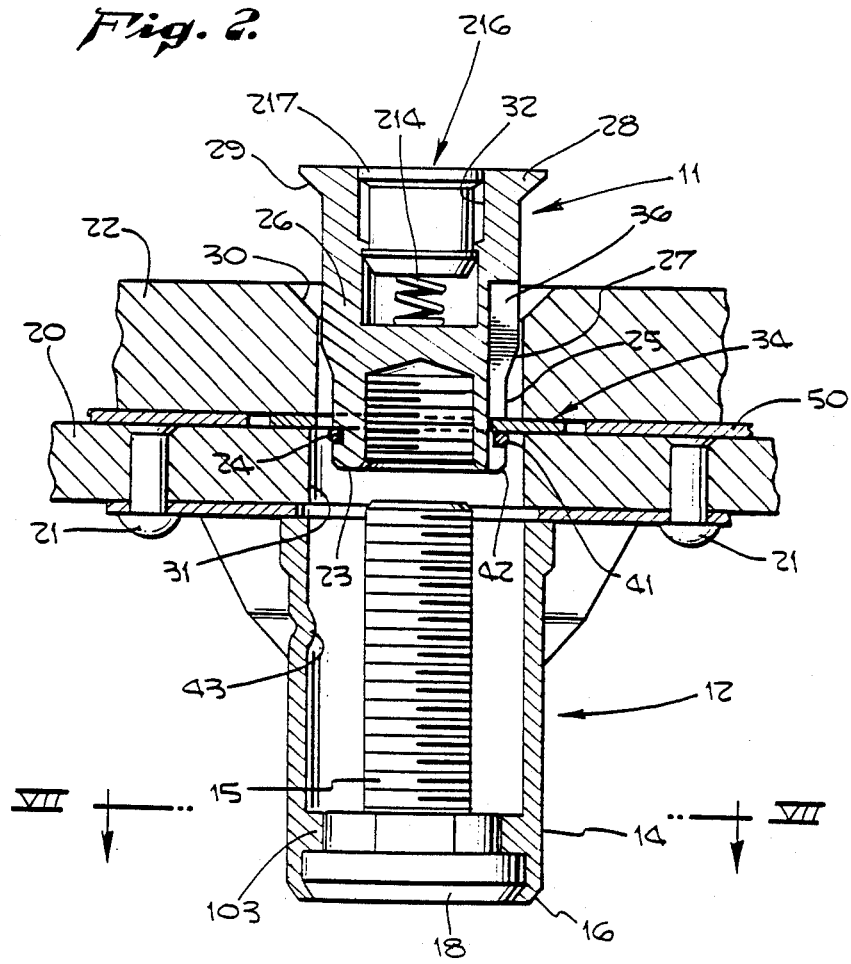

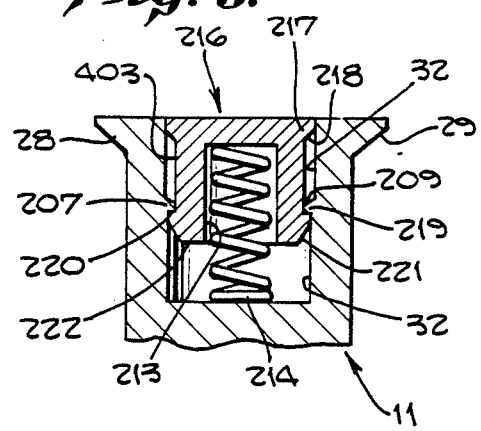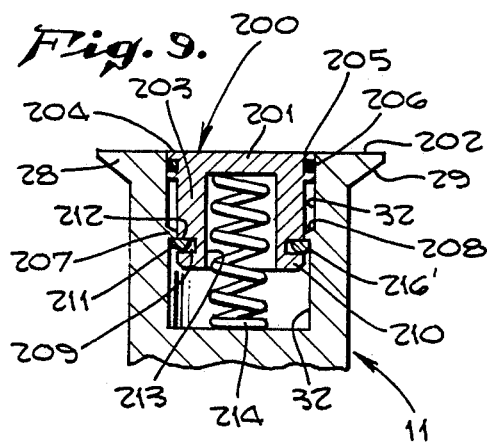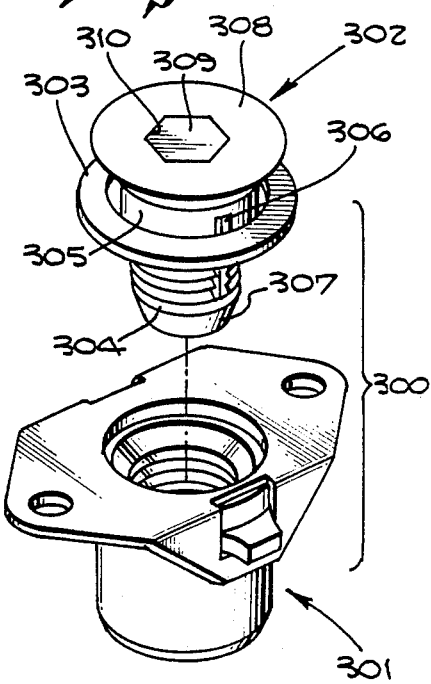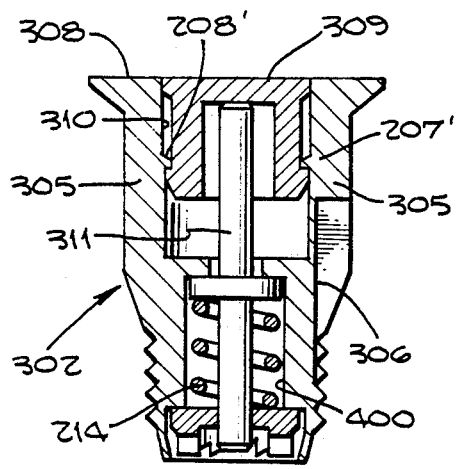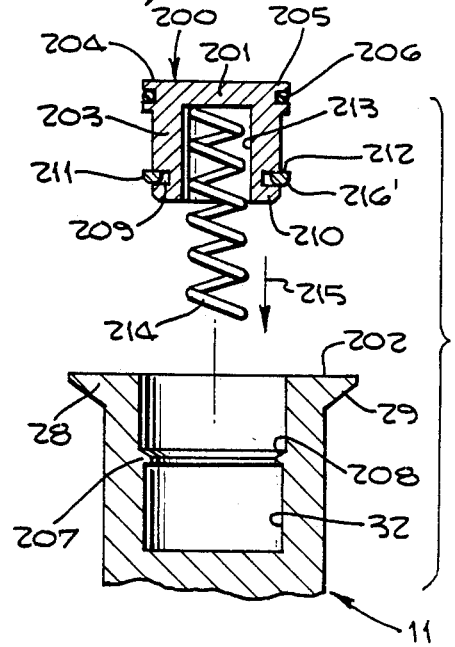

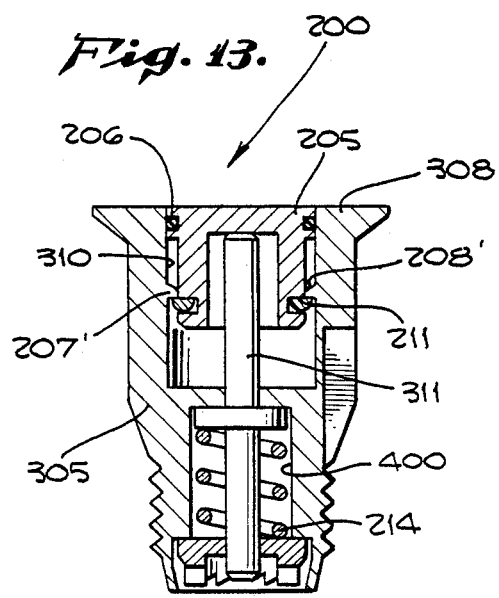
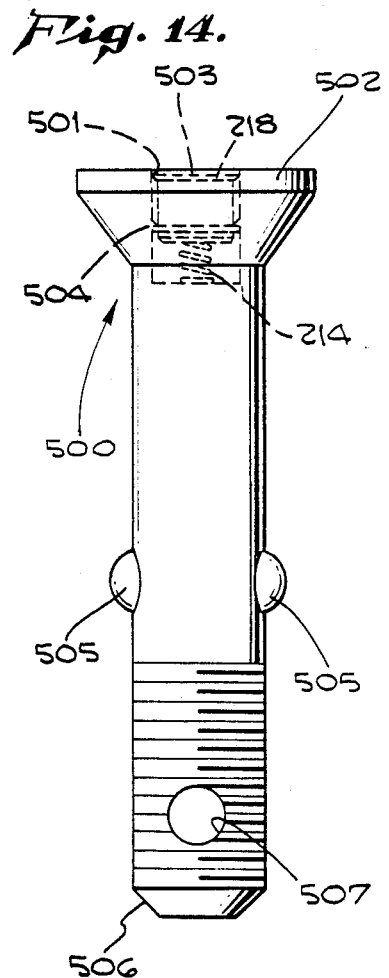

FLUSH MOUNTED BOLT

BACKGROUND OF THE INVENTION

1. Field of the Invention

The invention relates to quick action fasteners; and, more particularly, to improved bolts for use in quick action fasteners for panels of aircraft or the like.

2. Description of the Prior Art

Quick action fasteners are well known in the art. One such fastener is described in U.S. Pat. No. 2,991,816 to Harbison et al. These fasteners comprise a bolt body of stepped diameters and are used in aircraft panels having holes of certain diameters. These fasteners can be shifted in the panel holes, due to their stepped diameters, to compensate for slight misalignment of the holes in an abutting panel and subpanel In my co-pending application Ser. No. 922,072, filed Oct. 20, 1986, now U.S. Pat. No. 4,723,881, issued Feb. 9, 1988, and commonly assigned, I disclose a quick action aircraft fastener assembly which can be used in preexisting aircraft panel and sub-panel holes while providing for some misalignment of the holes without danger of loss of components of the fastener assembly. The bolt has a shank of varying diameters and is retained to a panel wherein the retainer does not have to expand and contract as it passes over the varying diameters of the bolt body.

Such fasteners in the prior art, and most flush head type bolts, have a countersunk opening in the head thereof configured to a tool, such as a hex opening and Allen-type tool, whereby the tool an be inserted into the opening and the bolt rotated to install or remove the same.

These open holes can become contaminated and cause airdrag. These holes can be filled up with putty or the like after installation but subsequent adjustment or removal would require drilling out the dried putty. This of course is time consuming and results in lost man hours.

There is thus a need for bolts having countersunk openings for engagement by a tool to rotate the same provided with means for automatically closing off the openings in a flush manner after rotation.

SUMMARY OF THE INVENTION

It is an object of this invention to provide an improved quick action fastener assembly having a retainer retaining a bolt having a head with a countersunk opening, to a panel, the opening having a plug normally closing off the same in a flush manner but allowing insertion of a tool therein.

It is further an object of this invention to provide such a fastener assembly having a flush mounted bolt with a head having a countersunk opening for engagement of a tool therein to rotate the same, the openings being normally closed off by a plug flush with the exterior of the bolt head.

These and other objects are preferably accomplished by providing a fastener assembly comprising a receptacle assembly having a threaded stud secured to the undersurface of the sub-panel. The assembly includes a bolt having an enlarged head at one end with a countersunk opening therein and a nose at the other end. The panel has a countersunk opening aligned with an opening in the sub-panel.

The bolt is threaded for threaded engagement to the stud. The body of the bolt may have a plurality of spaced grooves extending longitudinally along the outer surface of the bolt body. A retainer surrounds the bolt body having spaced ears riding in the grooves and a stop ring in a groove adjacent the nose of the bolt stops the downward movement of the retainer. The countersunk opening in the bolt head is configured similarly to a tool for insertion therein to rotate the same. A plug having an outer surface flush with the bolt head surrounding the countersunk opening therein is disposed in the countersunk opening in the bolt head. In this manner, the bolt may be disposed in the countersunk opening in the panel with the retainer on the blind side of the panel and the stop ring preventing movement of the retainer off of the bolt body thus retaining the bolt to the panel, insertion of a tool moving the plug downwardly to allow rotation of the bolt. The bolt may also be any suitable flush mounted bolt having a countersunk opening in the head for insertion of a tool therein.

BRIEF DESCRIPTION OF THE DRAWING

FIG. 1 is an exploded view of one type of fastener assembly having a bolt head in accordance with the teachings of the invention;

FIG. 2 is a vertical sectional view of the fastener assembly of FIG. 1 installed in a panel and abutting sub-panel;

FIG. 5 is a perspective view of one element of the fastener assembly of FIGS. 1 to 4;

FIG. 8 is a vertical cross-sectional view of a portion of the apparatus of FIG. 2;

FIG. 9 is a view similar to FIG. 8 showing another embodiment thereof;

FIG. 10 is an exploded view showing the assembly of the embodiment of FIG. 9;

FIG. 11 is an exploded view of still another embodiment of the invention;

FIG. 12 is a vertical sectional view of a portion of the assembly of FIG. 11;

FIG. 13 is a view similar to FIG. 12 showing another modification of the invention; and FIG. 14 is a view of another bolt modified in accordance with the invention.

DESCRIPTION OF THE PREFERRED EMBODIMENT

Figure 7:
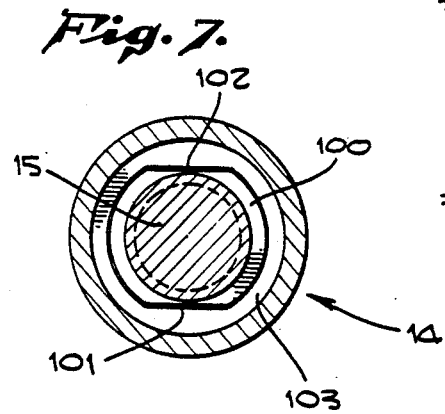
FIG. 7 is a view taken along lines VII—VII of FIG. 2.

Referring now to FIG. 1 of the drawing, there is shown a fastener assembly 10 comprising a bolt adapted to mate with a receptacle assembly 12. Receptacle assembly 12 is comprised of a receptacle bracket or basket 13, a barrel 14 and an externally threaded stud 15. As seen in FIG. 2, the lower end 16 of barrel 14 is crimped about the base 18 of stud 15 to engage the stud 15 and connect the barrel 14 thereto. As seen in FIG. 1, the stud 15 has a boss 100 with flattened areas 101, 102 (see also FIG. 7). As seen in FIG. 2, barrel 14 has an inwardly extending peripheral wall 103 configured similarly to boss 100 (FIG. 7). This is an anti-rotation feature preventing stud 15 from rotating within barrel 14 thereby allowing the stud 15 and barrel 14 to mate and lock and act as one unitary element. Barrel 14 also includes tabs 19 which are inserted in a pair of slots 20' formed in basket 13, thereby connecting the barrel 14 to the basket 13. Slots 20' are circumferentially greater in length than the width of tabs 19 thereby permitting the barrel 14 and stud 15 to rotate to a limited degree with respect to basket 13. Basket 13 is secured to substructure 20 (FIG. 2) by any suitable means, such as rivets 21. Although receptacle assembly 12 and basket 13 have been described as an assembly of individual components, obviously a single element may be used.

Bolt 11 is shown in FIG. 2 in its disengaged and withdrawn position with respect to panel 22.

Figure 4:
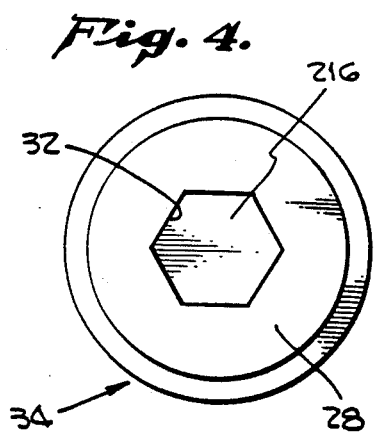
FIG. 4 is a view taken along lines IV—IV of FIG. 3.

Bolt 11 includes a blunt nose 23, an annular groove 24 adjacent nose 23 and a generally cylindrical lower shank portion 25 (FIG. 2). Bolt 11 also includes an upper generally cylindrical shank portion 26 of an outer diameter substantially greater than the outer diameter of lower shank portion 25. A tapered portion 27 provides transition from upper shank portion 26 to lower shank portion 25. Bolt 11 has an enlarged head 28 at the upper end of shank portion 26 which head 28 is tapered at tapered portion 29 on its undersurface leading to shank portion 26. Head 28 is adapted to abut or bear against a countersunk opening 30 (FIG. 2) in panel 22 when threaded to stud 15 as will be discussed. Countersunk opening 30 in panel 22 is aligned with an opening 31 through sub-panel 20 as shown in FIG. 2. A hex socket 32 (see also FIG. 4) may be provided in head 28 as is well known in the art for receiving a suitable wrench therein. However, as particularly contemplated in the present invention, hex socket 32 may be deeper than the socket 32 in my co-pending application Ser. No. 922,072, now U.S. Pat. No. 4,723,881. A plug or plunger 216 (FIG. 2) is provided having an upper lip or flange 217 (see also FIG. 8) with an outer diameter generally the same as the inner diameter of socket 32 with a downwardly and inwardly tapered undersurface 218. The plunger 216 is widened below an annular flange 207 formed in socket 32 to have a flat upper surface 219, an outer surface 220, generally the same as the inner diameter of socket 32 below flange 207, with a downwardly and inwardly tapered surface 221 serving to form the blunted nose 222. Plug or plunger 216 is similar in cross-section (e.g., hex) to the inner cross-section of the socket 32.

The inwardly extending flange 207 provided on the interior wall of socket 32 has a downwardly and inwardly tapered upper surface 208. The inner diameter of flange 207 is generally the same as the outer diameter of body portion 403.

The entire plunger body is made of a resilient material allowing the plunger 216, with spring 214 disposed within cavity 213 formed in the body of plunger 216, to be inserted into socket 32, the resiliency thereof allowing the tapered surface 221 to engage tapered surface 208 and slide therepast to the FIG. 8 position. Teflon is a preferred material since it has good resiliency, is non-sticking and is its own lubricator. Water or other contamination is prevented from entering socket 32 around plunger 216 by reason on the engagement of flange 217 with the inner wall of the socket 32. Pushing down on plunger 216 with a hex tool, against the bias of spring 214, allows rotation of the bolt 11 with the spring 214 returning plunger 216 to the FIG. 8 position after withdrawal of the tool.

Figure 6:
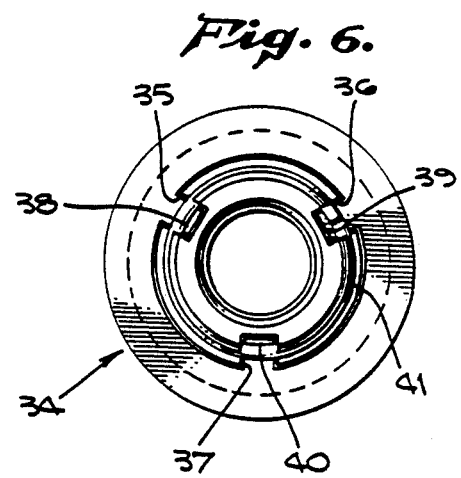
FIG. 6 is a view taken along lines VI—VI of FIG. 3.

As seen in FIGS. 1 and 6, bolt 11 includes a plurality, such as three, of longitudinally extending grooves 35 to 37 extending along the exterior thereof longitudinally and generally parallel to the longitudinal axis of bolt 11. These grooves 35 to 37 are preferably generally rectangular in cross-section and may be of a depth at least substantially equal to the inward extent of the three ears 38 to 40 on annular ring 34 as seen in FIG. 5. Ears 38 to 40 cooperate with guide means in the form of grooves 35 to 37 on bolt 11 to provide indexing means for ring 34 as will be further discussed hereinbelow.

Figure 3:
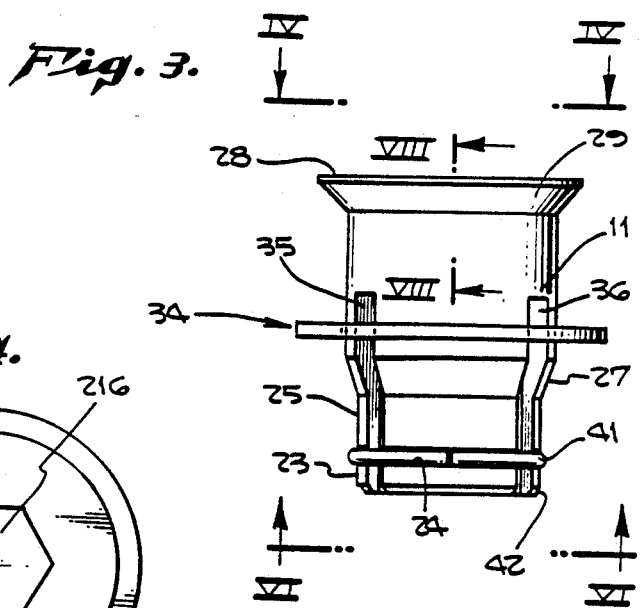
FIG. 3 is a vertical view of the bolt of FIG. 1 with the retainer and stop ring mounted thereto.

As seen in FIG. 1, an annular resilient locking ring 41 is provided of a diameter adapted to pass over nose 23 of bolt 11 and snap-fit into groove 24. The nose 23 of bolt 11 may have a terminal tapered end 42 (FIG. 3) leading therein to facilitate assembly of ring 41 and guide the nose 23 of bolt 11 into the countersunk opening 30 through panel 22.

The assembly of the elements of FIG. 1 will now be described. After formation of openings 30 and 31 through panel 22 and sub-panel 20, respectively, the receptacle assembly 12 is secured to the underside of sub-panel 20 by riveting basket 13 to panel 20 by rivets 21 passing through holes 44 (FIG. 1) in basket 13 and into sub-panel 20. The barrel 14 and stud 15 are secured thereto as heretofore described. One or more inwardly facing protrusions 43 (FIG. 2) may be provided on the exterior of barrel 14. These protrusions 43 provide a friction lock between the internal surface of barrel 14 and the exterior of bolt 11. Of course, any suitable thread lock as is known in the art may be used, such as a plastic insert installed through the side of barrel 14 or protrusions on the threads of the bolt.

Bolt 11 is now inserted through countersunk opening 30 and into the ring 34 with ears 38 to 40 entering grooves 35 through 37, respectively, (FIG. 6) with retaining ring 41 snap fitting over nose 23 and into groove 24 as heretofore described. Thus, ring 34 cannot move off of bolt 11 because of its engagement with ring 41 (ears 38 to 40 abutting against ring 41 in its downwardly movement—see FIG. 3) nor move up past enlarged head 29. Thus, bolt 11 is trapped in opening 30 in panel 22.

Sub-panel 20 may now be brought into position abutting against panel 22, with gasket 50 disposed therebetween as will be discussed further hereinbelow and bolt 11 may be threaded to stud 15 on the receptacle assembly 12. Thus, sub-panel 20 is releasably secured to panel 22. The ring 34 rides in grooves 35 to 37 up and down over the differing diameter sections of bolt 11 as heretofore described.

The bolt assembly described herein can be used for conventional size diameter holes in aircraft panels. The bolt 11 has a tapered shank so that, as soon as it is withdrawn from the panel hole, there is no load bearing on the shank area of lesser outer diameter than the upper shank area. Thus, the tabs 38 to 40 of ring 34 and the grooves 35 to 37 of bolt 11 serve to maintain the advantages of known fasteners, such as the Harbison et al. fastener described and claimed in the U.S. Pat. No. 2,991,816, while eliminating binding that might occur between the spring and bolt body of such prior art fasteners. Further, the ring 34 is a solid metallic ring and will not wear and lose its resiliency as might the spring 44 of the prior art Harbison et al. fastener. Since the ring 34 disclosed herein does not have to expand and contract as it moves along the differing diameter sections of the bolt body, it is not subject to fatigue as is the Harbison et al. fastener. Applicant's ring 34 is easier to manufacture and less expensive than the spring device 44 of Harbison et al. Thus, applicant's ring 34 will not come off, due to the retainer ring 41 in groove 24, whereas the Harbison et al. spring 44 might fatigue and come off resulting in loss thereof and, possibly, sucking of the same into the engine aircraft resulting in considerable damage. Of course, once the spring 44 of Harbison et al. is lost, the bolt itself may also shake loose and fall out of the panel in which it is installed.

Thus, rotation of the sleeve bolt 11 upon insertion of a tool and movement of the plug or plunger will cause it to threadably engage stud 15 of the receptacle assembly 12. Preferably, bolt 11 and stud 15 are provided with double lead threads in order to decrease the time and motion required to remove and install the panel. In some applications, the thickness of panel 22 and sealing requirements may necessitate the use of a gasket 50 (FIG. 2), preferably the same thickness as ring 34, between the panel 22 and sub-panel 20. Alternatively, the gasket 50 can be eliminated and ring 34 may be disposed in a counterbore formed in either the upper surface of sub-panel 20 or in the lower or blind side of panel 22.

It can be seen that I have described a quick action fastener having a bolt which, when freed from engagement with the stud, is retained to the access panel. The parts are simple and easy to install. The ring 34 may be quickly and easily stamped out of a metal stamping forming ears 38 through 40. Thus, no careful machining of parts is necessary.

As seen in FIG. 9, the single resilient body of plug 216 may be replaced by a plug having a retaining ring therein. Thus, as seen in FIG. 9, plug or plunger 200 is disposed within socket 32. Plunger 200 includes an upper surface 201 normally flush with the upper surface 202 of head 28 similar to the upper surface of plunger 216. Plunger 200 includes a main body portion 203 of an outer diameter less than the inner diameter of socket 32. A flange 204, of an outer diameter greater than that of body portion 203, and generally related to the inner diameter of socket 32, is provided at the top of plunger 200. An annular groove 205, generally rectangular in cross-section, is provided in flange 204 receiving therein an O-ring 206.

An annular groove 209, generally rectangular in cross-section, is provided on body portion 203 adjacent the nose 210 thereof, which may be blunted, as shown. A retaining ring 211 is disposed within groove 209 being generally circular in cross-section but flattened on the upper surface 212 thereof with a lower rounded bottom 216'.

Cavity 213 is provided interiorly of plunger 200 as in plunger 216 receiving therein a similar coiled spring 214. Spring 214 normally biases plunger 200 upwardly to the FIG. 9 position (as in the FIG. 8 embodiment), the flattened surface 212 of ring 211 abutting against flange 207 to arrest the upper movement thereof. In assembling plunger 200 to bolt 11, O-ring 206 is placed into groove 205 and ring 211 is placed within groove 209 with flattened surface 212 facing upwardly as seen in FIG. 10. Spring 214 is disposed within cavity 213.

The assembled plunger 200 is now inserted into cavity 32 in the direction of arrow 215. The rounded bottom 216' of ring 211 engages the tapered surface 208 pushing or compressing resilient ring 211 so that it snaps over flange 207 and moves below flange 207 to the position shown in FIG. 9. It can be appreciated that O-ring 206 acts as a seal to prevent fluids or other contamination from entering socket 32 between plunger 200 and the inner walls of socket 32. Pushing down on plunger 200 with a suitable hex tool (not shown) against the bias of spring 214 allows insertion of the tool engaging the portion of hex socket 32 above flange 207 permitting rotation thereof. After withdrawal of the tool, the spring 214 returns the plunger 200 to the FIG. 9 position. Thus, a neat flush surface is provided between surfaces 201, 202.

Although the invention has been disclosed hereinabove as applicable to a tapered-type fastener, obviously the inventive concept is applicable to any flush head bolt having an internal hex-type socket. Thus, as seen in FIG. 11, a flush head captive panel fastener assembly 300 is shown. This assembly, except for the addition of either of the plungers of FIGS. 2 and 9, is otherwise identical to the assembly disclosed in U.S. Pat. No. 4,191,236 to Duran and reference should be made thereto for a complete understanding of fastener 300. Thus, fastener 300 has a receptacle assembly 301 and a stud assembly 302. A ring 303 is mounted on the threaded shaft 304 of bolt 305, riding in slots 306 therein between nose 307 and enlarged head 308, all as is described and illustrated in U.S. Pat. No. 4,191,236.

As particularly contemplated in the present invention, the plug or plunger 309 is disposed in the hex socket 310 in head 308. This is shown in FIG. 12 wherein release pin 311 (identical in structure and operation to pin 50 of U.S. Pat. No. 4,191,236) extends upwardly within hex socket 310. A flange 207', identical to flange 207 of the embodiment of FIG. 2, is provided on the inner wall of socket 310, flange 207' having an upper tapered surface 208' again identical to surface 208 in FIG. 2. Plunger 309 is mounted in socket 310 and operates identical to plunger 216 with spring 214 disposed in cavity 400 in the lower portion of bolt 305, biasing pin 311 upwardly as described in U.S. Pat. No. 4,191,236.

Of course, the plunger 200 of the embodiment of FIG. 9 can also be mounted to stud assembly 302 of FIG. 11. This is shown in FIG. 13 wherein like numerals refer to like parts of the embodiment of FIGS. 11 and 12. It can be seen that plunger 200 is mounted in the hex socket 310 of the head 308 of stud assembly 302, installed as discussed hereinabove in the discussion of FIG. 9, and operates accordingly.

Also, as seen in FIG. 14, a conventional flush head-type positive locking bolt 500, having a hex cavity 501 in the enlarged head 502, may be provided with a plug 503 identical to plug 216 (or a plug identical to plug 200) with a flange 504 (identical to flange 207) on the inner wall of cavity 501. Bolt 500 is of the ball-type, balls 505 which are spring biased, being shown, with a tapered nose 506 and pin receiving throughbore 507 adjacent nose 506, all as is well known in the fastener art. Thus, plug 503 operated identical to plug 216, like numerals referring to like parts, and further discussion is deemed unnecessary. Also, plug 200 of FIG. 9 can be used in place of plug 503 and again, further discussion or description thereof is deemed unnecessary.

It can be seen that I have disclosed an improved hex socket for a flush head bolt having particular application in the aircraft industry. The plungers or plugs in the various embodiments present a flush surface to the bolt head and keep contamination and the like thereout. The hex socket for a flush head bolt has wide applications in the aircraft industry. For example, my patented captive panel fastener disclosed in my U.S. Pat. No. 4,464,090, the teachings of which are incorporated herein by reference, may include such a hex socket.

Although specific embodiments of the invention have been disclosed, the description is for illustration only and the invention is to be limited only by the appended claims.

I claim:

1. In a fastener assembly for joining a panel to a sub-panel comprising a receptacle assembly having a threaded portion secured to the undersurface of the sub-panel, a bolt having an enlarged flush head at one end and a nose at the other end, said nose being adapted to extend through a countersunk opening in said panel coaxially aligned with an opening in said sub-panel with the threaded portion of said receptacle assembly coaxially aligned with both of said openings, said bolt being threaded for threaded engagement to the threaded portion of said receptacle assembly, said head having a socket therein configured to a tool adapted to be inserted into said socket to rotate said bolt, the improvement which comprises:

a plug mounted in said socket and configured similarly thereto having an outer surface flush with the portion of the head of said bolt surrounding said socket; and plug displacement and flush return means associated with said plug and said socket for moving said plug from a first position wherein the outer surface thereof is flush with the portion of the head of said bolt surrounding said socket to a second position wherein the outer surface of said plug is disposed internally of said socket upon insertion of a tool into said socket thereby permitting rotation of said bolt, said plug displacement and flush return means including a flange having an annular groove therein at the upper end of said plug, the outer diameter of said flange being substantially the same as the inner diameter of said socket and similarly configured in cross-section to provide a seal between said plug and said socket.

2. In the assembly of claim 1 including a resilient O-ring disposed in said groove.

3. In the assembly of claim 2 wherein said plug displacement and flush return means includes an internal flange mounted on the inner wall of said socket between the top and bottom thereof, said plug having a nose portion with an annular groove therein, and a retaining ring mounted in said last-mentioned groove abutting against the lower surface of said flange when said plug is in said first position.

4. In the assembly of claim 3 wherein the upper surface of said retaining ring and the lower surface of said flange are flat.

5. In the assembly of claim 4 wherein the outer body portion of said plug between said plug flange and said socket flange when said plug is in said first position is less than the outer diameter of said plug flange.

6. In the assembly of claim 4 wherein the upper surface of said socket flange tapers downwardly and inwardly.

7. In the assembly of claim 4 wherein said plug displacement and flush return means includes a cavity in said plug receiving a spring therein, said spring abutting against the bottom wall of said socket and normally biasing said plug to said first position.

* * * * *